United States Patent [19]

Hatae et al.

[11] Patent Number: 5,724,609
[45] Date of Patent: Mar. 3, 1998

[54] APPARATUS FOR TRANSFER-CONTROLLING DATA BY DIRECT MEMORY ACCESS

[75] Inventors: Seido Hatae; Kazuyuki Mitsuishi, both of Kawasaki, Japan

[73] Assignee: Fujitsu Limited, Kawasaki, Japan

[21] Appl. No.: 358,724

[22] Filed: Dec. 19, 1994

[30]  Foreign Application Priority Data

Jan. 25, 1994 [JP] Japan .................. 6-006290

[51] Int. Cl.$^6$ ................................. H01J 3/00
[52] U.S. Cl. .................. 395/842; 395/847; 395/848; 395/733; 395/740; 395/868; 395/438; 395/439; 395/308; 395/821; 395/872
[58] Field of Search ................ 395/842, 843, 395/847, 848, 849, 868, 869, 735, 856, 872, 438, 439, 853, 308, 309, 800, 741

[56]  References Cited

U.S. PATENT DOCUMENTS

| | | | |
|---|---|---|---|
| 4,722,051 | 1/1988 | Chattopadhya | 395/842 |
| 5,131,081 | 7/1992 | MacKenna et al. | 395/275 |
| 5,179,663 | 1/1993 | Iimura | 395/250 |
| 5,287,486 | 2/1994 | Yamasaki et al. | 395/425 |
| 5,307,471 | 4/1994 | Ishikawa | 395/425 |
| 5,398,324 | 3/1995 | Matida et al. | 395/425 |
| 5,414,816 | 5/1995 | Oyadomari | 395/821 |
| 5,416,907 | 5/1995 | Polzin et al. | 395/821 |
| 5,463,752 | 10/1995 | Benhase et al. | 395/481 |
| 5,475,859 | 12/1995 | Kamabayshi et al. | 395/825 |
| 5,539,913 | 7/1996 | Furuta et al. | 395/825 |

*Primary Examiner*—Jack B. Harvey
*Assistant Examiner*—Raymond N. Phan
*Attorney, Agent, or Firm*—Staas & Halsey

[57]  ABSTRACT

A bus controller provided with a buffer memory performs DMA data transfer between a main storage unit of a system bus and an input/output control unit of a local bus. An interruption control section of the bus controller keeps an interruption signal at a response suppress section upon detection of an input/output end interruption signal from a unit on the local bus side, and thus suppress sending thereof to a processor of the system bus. When the end of data transfer to the main storage unit is determined from the data transfer monitor section in the interruption suppressed state, the suppressed state is released and an input/output end interruption notice is given to the processor. Even upon earlier end of data transfer on the local bus, therefore, consistency of data sent to the main storage is ensured.

10 Claims, 13 Drawing Sheets

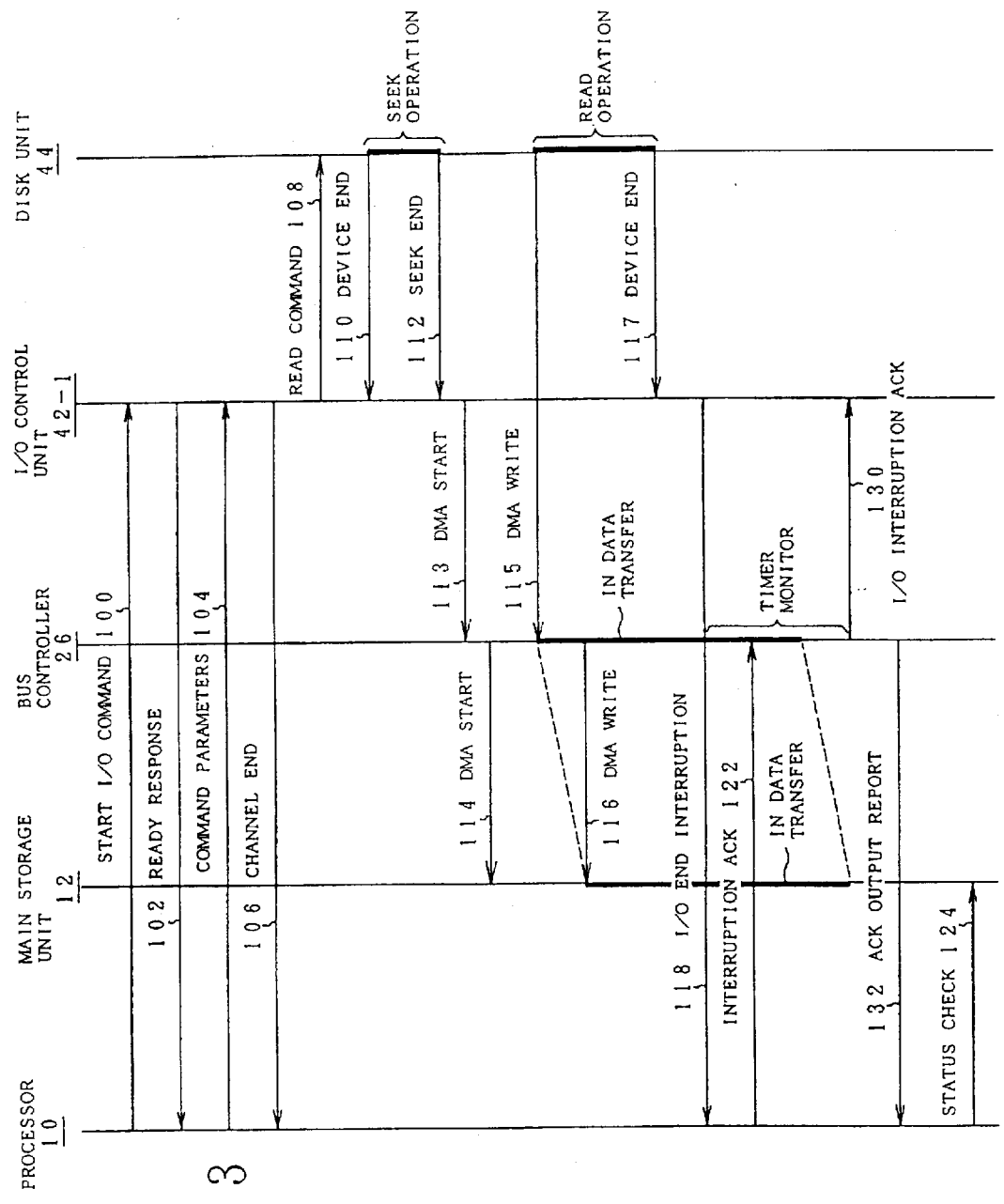

APPARATUS FOR TRANSFER-CONTROLLING DATA BY DIRECT MEMORY ACCESS

BACKGROUND OF THE INVENTION

The present invention relates to an apparatus for controlling data transfer by direct memory access (DMA) between input/output units connected through an input/output control unit to a main storage unit and a local bus connected to a system bus. More particularly, the present invention relates to an apparatus for controlling data transfer by direct memory access by providing a buffer memory for transfer between the system bus and the local bus.

When using a main storage unit as the common memory by a plurality of processors, it is the conventional practice to connect the processors and the main storage units to a system bus permitting high-speed transfer. The system bus and the local bus are connected by a bus controller provided with a buffer memory, and data transfer is accomplished by direct memory access. Upon receipt of an input/output request from a processor, the bus controller disconnect the processor, and performs necessary data transfer by means of hardware between the main storage unit and an input/output control unit having an input/output unit under the control thereof. Taking transfer of data to be written into the main storage unit from a magnetic disk unit as an example, a seek command is first issued to the input/output control unit to break connection in accordance with command parameters received along with the input/output request from the processor. When a seek end response is received from the magnetic disk unit, a read command is issued by reconnection to request transfer start (DMA start) to the bus controller, and upon receipt of a ready response, begins transfer of read data. After once storing the transfer data from the magnetic disk unit into the buffer memory, the bus controller begins transfer of write data to the main storage unit of the system bus. Upon completion of data transfer from the magnetic disk unit, an interruption signal of the end of input/output is issued from the input/output control unit to the bus controller. Upon detection of this interruption signal of the end of input/output the interruption control section of the bus controller transmits an interruption signal of the end of input/output also to the processor having made the input/output request. The processor having received the input/output interruption signal from the bus controller recognizes the end of the requested input/output control, and begins a command sequence of status check to the main storage unit for the purpose of checking up status information of the transfer data written into the main storage unit. When status check reveals no error, the transfer is deemed to have been normally completed, and the transfer data is processed. If status check suggests an error, retry processing is selected to try an input/output request again.

However, in an apparatus in which data transfer is accomplished between individual units of the system bus and the local bus by direct memory access of such a conventional bus controller, it may take a long period of time to transfer data to be written to the main storage unit because of the difference in the bus width or the transfer speed between buses, and the status of use of the buses. In this case, even upon completion of transfer on the local bus side, consistency of data between the input/output unit and the main storage unit may not be ensured, since transfer of write data into the main storage unit has not as yet been completed. More specifically, upon completion of data transfer on the local bus side, the processor having received the interruption signal of the end of input/output from the bus controller acquires the system bus for conducting status check of the main storage unit. However, if data transfer of write data conducted by hardware from the buffer memory of the bus controller to the main storage unit has not as yet been completed at this moment, acquisition of the system bus by the processor causes discontinuance of data transfer. Even when data is transferred at a high speed on the local bus, therefore, transfer on the system bus side, if taking much time, prevents ensuring of consistency of data with the main storage unit, thus causing contradiction in data.

SUMMARY OF THE INVENTION

According to the present invention, there is provided a data transfer control unit which, in data transfer from a unit of the local bus to another unit of the system bus, consistency of data can be ensured between units even earlier end of data transfer on the local bus.

In the present invention, the processor and the main storage unit are connected to the system bus, and input/output units such as magnetic disk units are connected through an input/output control unit to the local bus. The system bus and the local bus are connected by the data transfer control section which serves as a bus controller conducting direct memory access control. After receipt of an input/output instruction from the processor, the data transfer control section directly transfers data with an input/output unit through the main storage unit connected to the system bus and the input/output control unit connected to the local bus, without depending upon the processor.

A buffer memory temporarily storing data to be transferred is provided in the data transfer control section. An interruption control section is provided for the data transfer control section for reconnection after disconnection from the processor.

When detecting an interruption signal of end of input/output issued by the input/output control unit along with the end of data transfer of the input/output unit, the interruption control section notifies the processor of the end of data transfer and sends an interruption acknowledge signal from the processor to the input/output control unit.

For such a data transfer control unit of the present invention, a data transfer monitor section and a response suppress section are provided in the interruption control section. The data transfer control section on determines end of data transfer from the buffer memory to the main storage unit. When the interruption control section detects an input/output end interruption signal of the local bus, the response suppress section suppresses output of this interruption signal to the processor, and when there is available a result of determination of the end of data transfer by the data transfer monitor section, provides output of an input/output end interruption signal kept in the suppressed state to the processor.

At this point, the data transfer monitor section determines end of data transfer from the status of signal of the system bus. More specifically, this section determines whether or not data transfer has been completed by detecting the status of signal of a bus grant signal line provided in the system bus.

In another embodiment, the data transfer monitor section may be a timer section which, after detection of an input/output end interruption signal, determines end of data transfer upon the lapse of a certain predetermined period of time. There is previously set in this timer section a previously predicted period of time necessary from detection of the input/output interruption end signal to the end of data transfer to the main storage unit.

In further another embodiment, the response suppress section suppresses, when detecting an interruption acknowledge signal from the processor in the interruption control section, output of this interruption acknowledge signal to the input/output control unit, and when a result of determination of the end of data transfer is obtained in the data transfer monitor section, provides output of the interruption acknowledge signal in a suppressed state to the input/output control unit. In this case also, the data transfer monitor section determines the end of data transfer by detecting the status of signal of the system bus, for example, the status of signal of the bus grant signal line. A timer section which, upon the lapse of a certain predetermined period of time from the detection of the interruption acknowledge signal, determines the end of data transfer may be used as the data transfer monitor section. There is set, in the timer section, a predicted period of time necessary from the detection of the interruption acknowledge signal up to the end of data transfer.

According to the data transfer control unit of the present invention, the following functions are available. When transferring write data from the local bus to the main storage unit of the system bus while accumulating data in the buffer memory in the bus controller, interruption of input/output end caused by the end of data transfer of the local bus is suppressed and the system bus is monitored. In this state, after acknowledging the transfer of all data on the write buffer to the main storage memory, interruption is notified to the processor. This ensures consistency of data to the main storage unit, and permits high-speed data transfer.

When transferring write data from the local bus to the main storage unit of the system bus while accumulating data in the buffer memory in the bus controller, interruption of input/output end caused by the end of data transfer of the local bus is directly notified to the processor by the interruption control section. However, the interruption acknowledge signal sent out from the processor having received the interruption notice of input/output end is suppressed by the interruption control section. The system bus is monitored in this suppressed state, and after acknowledging transfer of all data on the write buffer to the main memory, interruption acknowledge is notified to the input/output control unit. This ensures consistency of data to the main storage unit, and permits high-speed data transfer.

Since the bus grant signal of the system bus is negated upon completion of data transfer, acknowledgement of the end of data transfer from the buffer memory to the main storage unit is determined from a change in this bus grant signal. It is also possible to determine the end of data transfer by waiting for the lapse of the maximum period of time for the transfer of all data of the buffer memory to the main storage unit.

The above and other objects, features and advantages of the present invention will become more apparent from the following detailed description with reference to the drawings.

BRIEF DESCRIPTION OF THE DRAWINGS

FIG. 13 is a time chart of processing operations shown in FIG. 11.

DETAILED DESCRIPTION OF THE PREFERRED EMBODIMENTS

Figure 1:
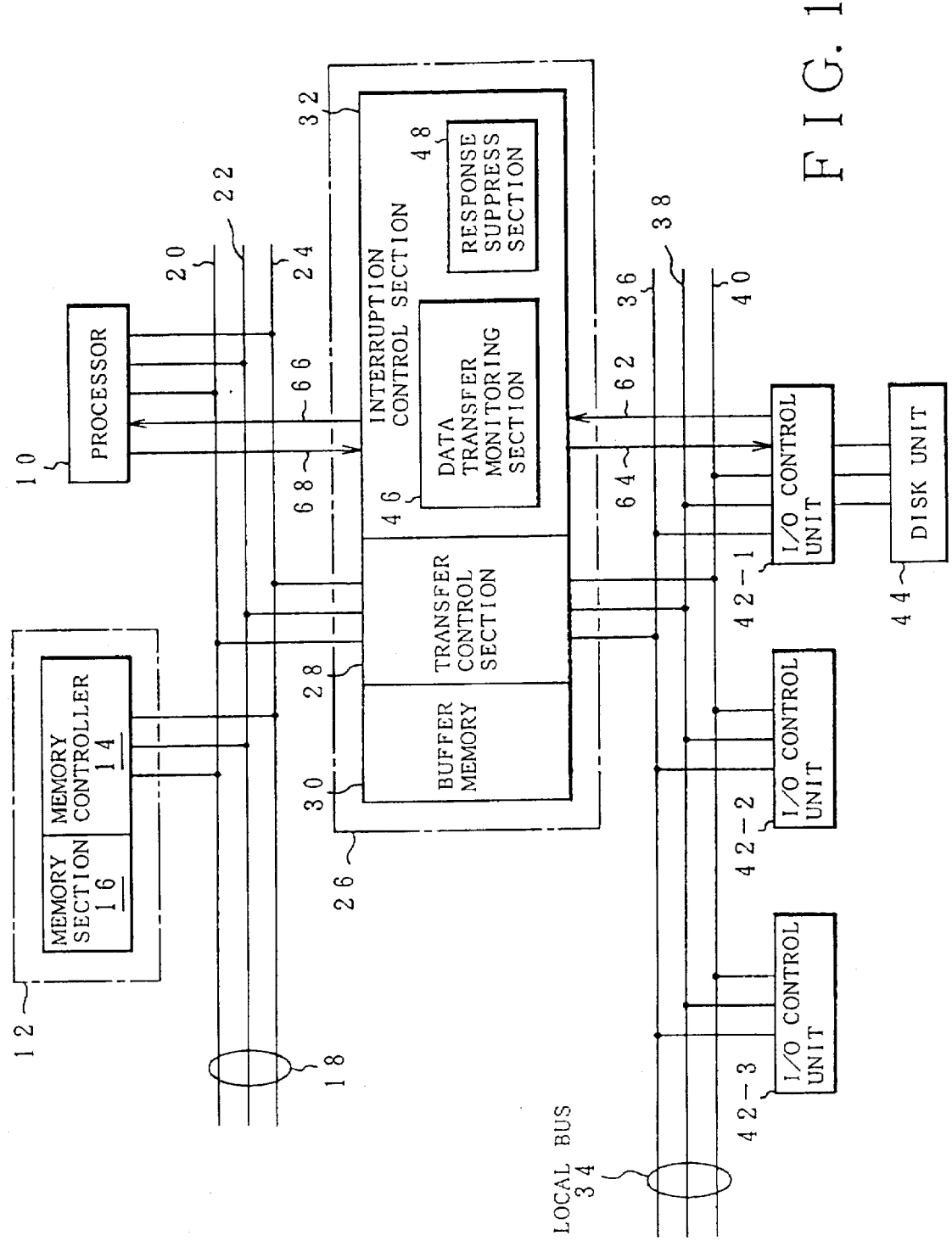
FIG. 1 is a block diagram of the system of the present invention.

FIG. 1 shows a computer system to which the present invention is applicable. A processor 10 is connected to a system bus 18. A main storage unit 12 used as a common memory when a plurality of processors 10 are connected is connected to the system bus 18. The main storage unit 12 comprises a memory controller 14 and a memory section 16. The system bus 18 comprises a control bus 20, an address bus 22 and a data bus 24. A local bus 34 serving as an input/output bus is provided separately from the system bus 18. A plurality of input/output control unit 42-1, 42-2 and 42-3 are connected to the local bus 34. In this embodiment, a magnetic disk unit 44 is connected as an input/output unit under the control of the input/output control unit 42-1. As the other input/output control units 42-2 and 42-3, magnetic disk units or any other appropriate input/output units may be connected as required. The local bus 34 comprises a control bus 36, an address bus 38 and a data bus 40.

Between the system bus 18 and the local bus there is provided a bus controller 26 which conducts data transmission by direct memory access between the two buses. The bus controller 26 is provided with a transfer control section 28 which performs data transfer by direct memory access between the two buses, and a buffer memory 30 for temporarily storing transferred data. There is furthermore provided an interruption control section 32. An interruption control line 62 and an interruption acknowledge response line 64 are provided between the interruption control section 32 and the input/output control unit 42-1. Another interruption control line 66 and another interruption response acknowledge line 68 are provided between the interruption control section 32 and the processor 10.

Direct access memory control by the bus controller 26 is effected as follows. First, assume, for example, that the processor 10 issues an input/output request command specifying a disk unit 44 under the control of the input/output control unit 42-1 to the transfer control section 28 of the bus controller 26. When the transfer control section 28 receives this input/output request command, it is connected to the processor 10 through the system bus 18. Upon receipt of command parameters as to the input/output request command from the processor 10, the transfer control section 28 breaks the connection with the system bus 18.

Then, the transfer control section 28 is connected to the input/output control unit 42-1 through the local bus 34, transmits the command parameters received from the processor 10 to the input/output control unit 42-1, and breaks the connection. The input/output control unit 42-1 is connected to the disk unit 44 on the basis of the command parameters received through the bus controller 26, and breaks the connection after issuing a seek command. Upon receipt of a seek end notice from the magnetic disk unit 44, the input/output control unit 42-1 issues an interruption signal which notifies seek end to the interruption control section 32 through the interruption control line 62. Upon receipt of a receiving notice of the seek end interruption signal from the interruption control section 32, the transfer control section 28 is connected again to the input/output control unit 42-1 through the local bus 34, and at the same time, starts data transfer by direct memory access. If the disk unit 44 is in read operation, for example, read data sent from the input/output control unit 42-1 is transferred and written in as write data into the main storage unit 12 through the system bus 18 after accumulating data in the buffer memory 30.

Upon completion of data transfer, the input/output control unit 42-1 sends an input/output end interruption signal to the interruption control section 32 of the bus controller 26 through the interruption control line 62. In the conventional system, this input/output end interruption signal is sent directly by the interruption control line 66 to the processor 10. In the present invention, however, suppress processing of interruption notice to the processor 10 is carried out by a response suppress section 48 newly provided in the interruption control section 32. During suppression of an interruption notice, a data transfer monitoring section 46 newly provided in the interruption control section 32 monitors the end of data transfer from the buffer memory 30 of the bus controller 26 to the memory section 16 of the main storage unit 12. The response suppress section 48 releases the suppression state upon receipt of a determination notice of the end of data transfer from the data transfer monitor section 46, and sends an input/output end interruption signal through the interruption control line 66 to the processor 10.

Upon receipt of the input/output end interruption signal from the interruption control section 32 of the bus controller 26, the processor 10 provides output of an interruption acknowledge signal through an interruption acknowledge response line 68 to the interruption control section 32, and upon receipt of this signal, the interruption control section 32 sends out an interruption acknowledge signal to the input/output control unit 42-1. When the input/output control unit 42-1 receives this interruption acknowledge signal, a series of input/output control operations are recognized to have normally been completed, and the processing comes to an end.

After sending out the interruption acknowledge signal to the bus controller 26, on the other hand, the processor 10 acquires the system bus 18 to check up status information contained in write data transferred to the memory section 16 of the main storage unit 12, and executes the status data check sequence to decode the readout status data of the memory section 16. In this status check sequence, if the write data written into the memory section 16 after transfer from the bus controller 26 contains no abnormality, processing proceeds to the next step based on write data. If an abnormality is found in status checking, the same input/output request is issued again to the bus controller 26 for retry processing.

In another embodiment, the data transfer monitor section 64 provided in the interruption control section 32 of the bus controller 26 may be embodied also by a timer section which monitors the maximum time required until the completion of data transfer from the buffer memory 30 to the main storage unit 12. The response suppress section 48 may be configured, in further another embodiment, so as to suppress an interruption acknowledge signal issued from the processor 10 to the input/output control unit 42-1, in addition to suppression of an input/output end interruption signal from the input/output control unit 42-1. Suppression of this interruption acknowledge signal would suppress simultaneously transition to the status check routine to the main storage unit 12 after the end of data transfer in the processor 10.

Figure 2:
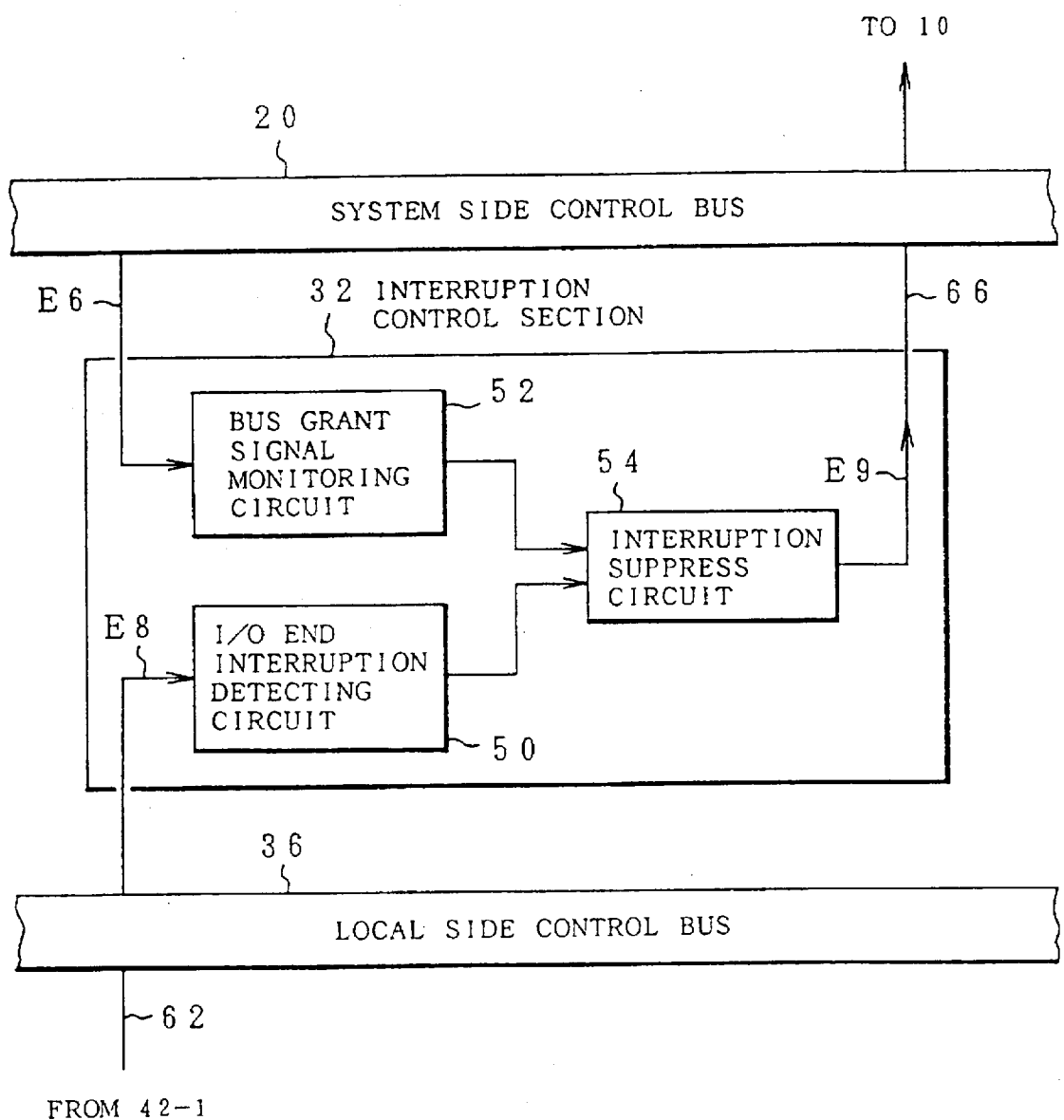
FIG. 2 is a block diagram of a first embodiment of the interruption control section shown in FIG. 1.

FIG. 2 shows a first embodiment of the data transfer monitor section 46 and the response suppress section 48 provided in the interruption control section 32 shown in FIG. 1. The interruption control section 32 of the bus controller 26 is provided with an input/output end interruption detecting circuit 50, a bus grunt signal monitoring circuit 52, and an interruption suppressing circuit 54. The input/output end interruption detecting circuit 50 monitors the input/output end interruption signal E8 of the interruption control line from the input/output control unit 42-1, and when this signal E8 is enabled, provides a detection output for suppression control to the interruption suppressing circuit 54. The bus grant signal monitoring circuit 52 monitors the status of signal on a bus grant signal line in the control bus 20. When the system bus 18 is occupied by an arbitrary unit, the bus grant signal line of the control bus 20 is enabled, and upon completion of data transfer, is negated by hardware into disabled state. The interruption suppressing circuit 54 suppresses the interruption notice to the processor 10 based on a detection output of the input/output end interruption detecting circuit 50 when the bus grant signal monitoring circuit 52 detects the enabled state of the bus grunt signal E6. When the bus grunt signal monitoring circuit 52 detects the disabled state of the bus grant signal E6 resulting from the end of data transfer, the interruption suppressing circuit 54 releases interruption suppress and issues an interruption notice signal E9 to the processor 10 through the interruption control line 66.

Figure 3:
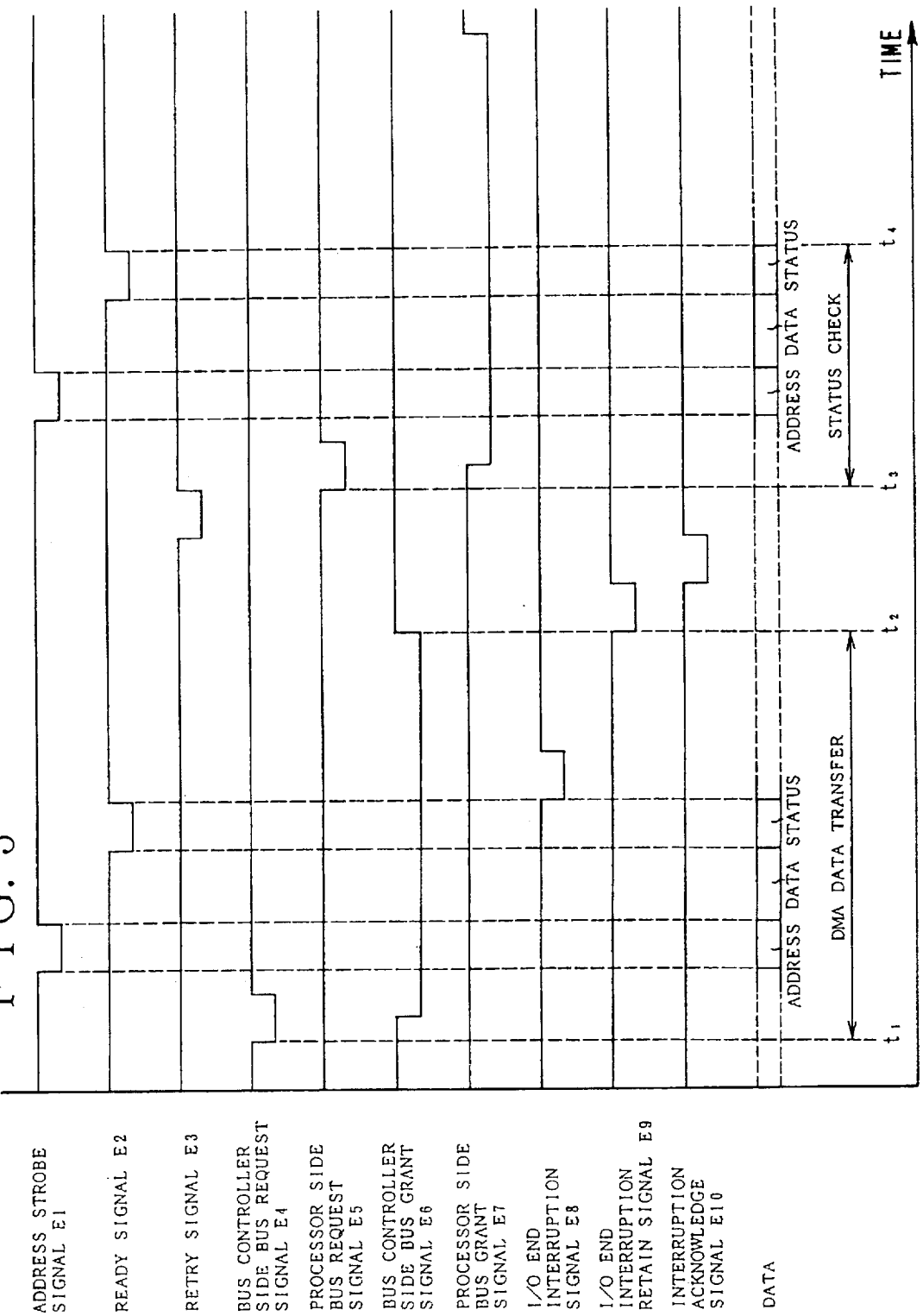
FIG. 3 is a timing chart of the signal waveform of bus control shown in FIG. 2.

The timing chart of FIG. 3 represents signal waveforms of the individual parts of data transfer control by the interruption control section 32 of the bus controller 26 shown in FIG. 2. More specifically, the signals include address strobe signal E1 of each control line provided in the control bus 20, ready signal E2, retry signal E3, bus request signal E4 on the bus controller side, bus request signal E5 on the processor side, bus grant signal E6 on the bus controller side, bus grant signal E7 on the processor side, input/output end interruption notice signal E9 by the interruption control line 66, and interruption acknowledge signal E10 by the interruption acknowledge response line 68. The status of data transfer is also shown.

In FIG. 3, the time between times of day t1 to t2 constitutes the data transfer time under direct memory access control of write data from the input/output control unit 42-1 to the main storage unit 12. In this DMA data transfer, the bus request signal E4 on the bus controller 26 side is first enabled, and then the bus grant signal on the bus controller side is enabled. Then, the address strobe signal E4 is enabled, and address data is accordingly transferred. Upon completion of address data transfer, the ready signal E2 is enabled, and in the meantime, data transfer of status information is conducted. Upon completion of data transfer of status information, the input/output end interruption signal E8 is enabled.

In the present invention, even when the input/output end interruption signal E8 is enabled, the bus grant signal E6 on the bus controller side is monitored. Since, during the bus grant signal E6 is in the enabled state, data transfer from the buffer memory 30 to the main storage unit 12 is continued, the input/output end interruption signal E8 is not sent to the processor 10 to achieve suppressed state. In this suppressed state of the input/output end interruption signal E8, upon completion of data transfer using the system bus 18, the bus grant signal E6 on the bus controller 26 side is disabled at the time of day t2. Upon detection of this change in the bus grant signal E6, the continued suppressed state of the interruption signal is released, and the input/output end interruption notice signal E9 is enabled. The input/output end interruption notice signal E9 thus enabled is taken into the processor 10. Then, the processor 10 enables the interruption acknowledge signal E10. This interruption acknowledge signal 10 is notified through the buds controller 26 to the input/output control unit 42-1.

Then, the retry signal E3 is enabled by the processing by the processor 10, and at the next period of time between times of day t3 to t4, status check of the main storage unit 12 is performed by the processor 10. as a result of this status check, the processor 10 enables the bus request signal E5 to acquire the system bus 18. At this point, the bus grant signal E6 on the bus controller 26 side is disabled and data transfer has been completed. Even if the processor 10 acquires the system bus 18 by means of the bus request signal E5, therefore, data transfer from the bus controller 26 is discontinued, so that consistency is never impaired through destruction of write data to be stored in the main storage unit 12.

Next to the bus request signal E4, the processor 10 enables the bus grant signal E7 thereof, and then enables the address strobe signal E1 to transfer the address to the main storage unit 12, and the processor 10 reads status information made available by the transfer of write data sent to the main storage unit 12. Upon completion of data transfer resulting from read of status information by the processor 10, the ready signal E2 is enabled, and transfer of status information is performed as a read operation of the main storage unit 12. Thus at the time of day t4, a series of status check operations by the processor 10 come to an end. Then, the processor 10 analyzes the status data of write data made available through input/output control, as read out from the stain storage unit 12. When the result of analysis of status information is normal, the processor 10 disables the bus grunt signal E7 and releases the system bus 18.

Figure 4:
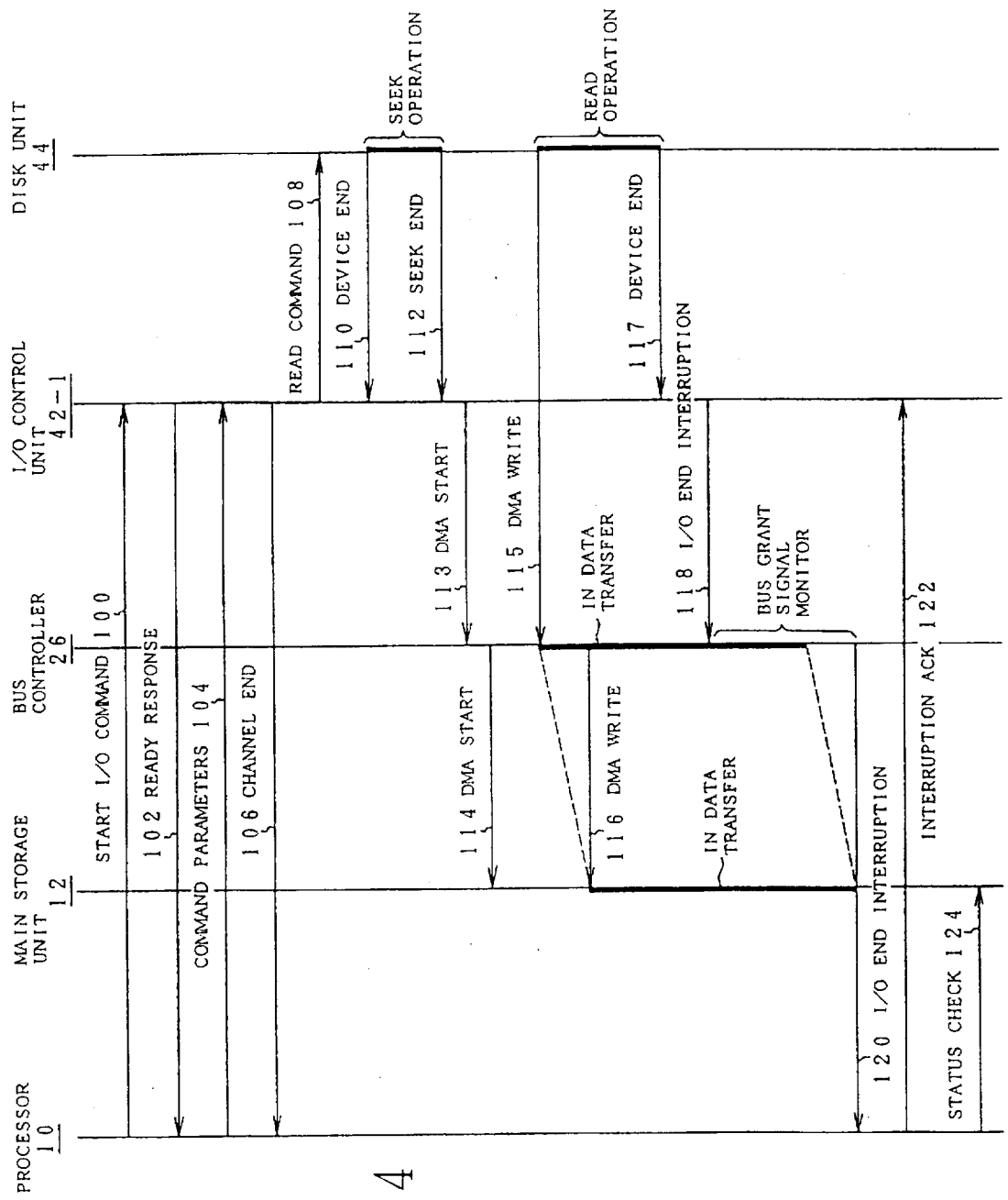
FIG. 4 is a time chart of processing operations shown in FIG. 2.

The time chart shown in FIG. 4 represents give-and-takes of the processor 10, the main storage unit 12, the bus controller 26, the input/output control unit 42-1 and the disk unit 44 shown in FIG. 1 with the interruption control section 32 shown in FIG. 2. First, upon receipt of an input/output request, the processor 10 issues a start I/O command 100. This start I/O command 100 is passed through the bus controller 26 to the input/output control unit 42-1, and a ready response 102 is returned if the unit 42-1 is in standby state. Then, the processor 10 sends command parameters 104 through the bus controller 26 to the input/output control unit 42-1. Upon receipt of the command, the input/output control unit 42-1 returns a channel end 106. This results in the end of delivery of various commands for input/output request among the processor 10, the bus controller 26 and the input/output control unit 42-1, and the connection with the system bus 18 and the connection with the local bus 34 are cut off.

Then, the input/output control unit 42-1 issues, for example, a read command 108 to the disk unit 44. The disk unit 44 starts seek operation after returning the device end 110 accompanying the receipt of the command. Upon completion of the seek operation, the disk unit 44 returns a seek end 112. Upon receipt thereof, the input/output control unit 42-1 requests DMA start 113 to the bus controller 26, and in addition, requests DMA start 114 to the main storage unit 12, acquiring the system bus 18 for connecting same with the main storage unit 12. Then, along with read operation from the disk unit 44, write data transfer to the main storage unit 12 is started. This write data is stored at the bus controller 26 into the buffer memory 30, and when the storage volume reaches a certain level, DMA write 116 is performed to the main storage unit 12. Upon completion of read operation, the disk unit 44 issues a device end 117, and is cut off from the disk input/output control unit 42-1. Then, along with the end of data transfer, the input/output control unit 42-1 issues an input/output end interrupt 118 to the bus controller 26. Even upon receipt of the input/output end interrupt 118, the interruption control section 32 of the bus controller 26 suppresses the interruption notice to the processor 10, and starts monitoring of the signal status of the bus grunt signal line of the system bus. Upon completion of transfer of the entire write data accumulated in the buffer memory 30 of the bus controller 26, the bus grant signal line is disabled, and this releases the interruption suppress of the bus controller 26, and an input/output end interruption notice 120 is given by the bus controller 26 to the processor 10. The processor receiving the input/output end interruption notice 120 returns an interruption acknowledge 122 through the bus controller 26 to the input/output control unit 42-1, which conducts end operations. Then, the processor 10 starts processing for status check 124 to the main storage unit 12.

Figure 5:
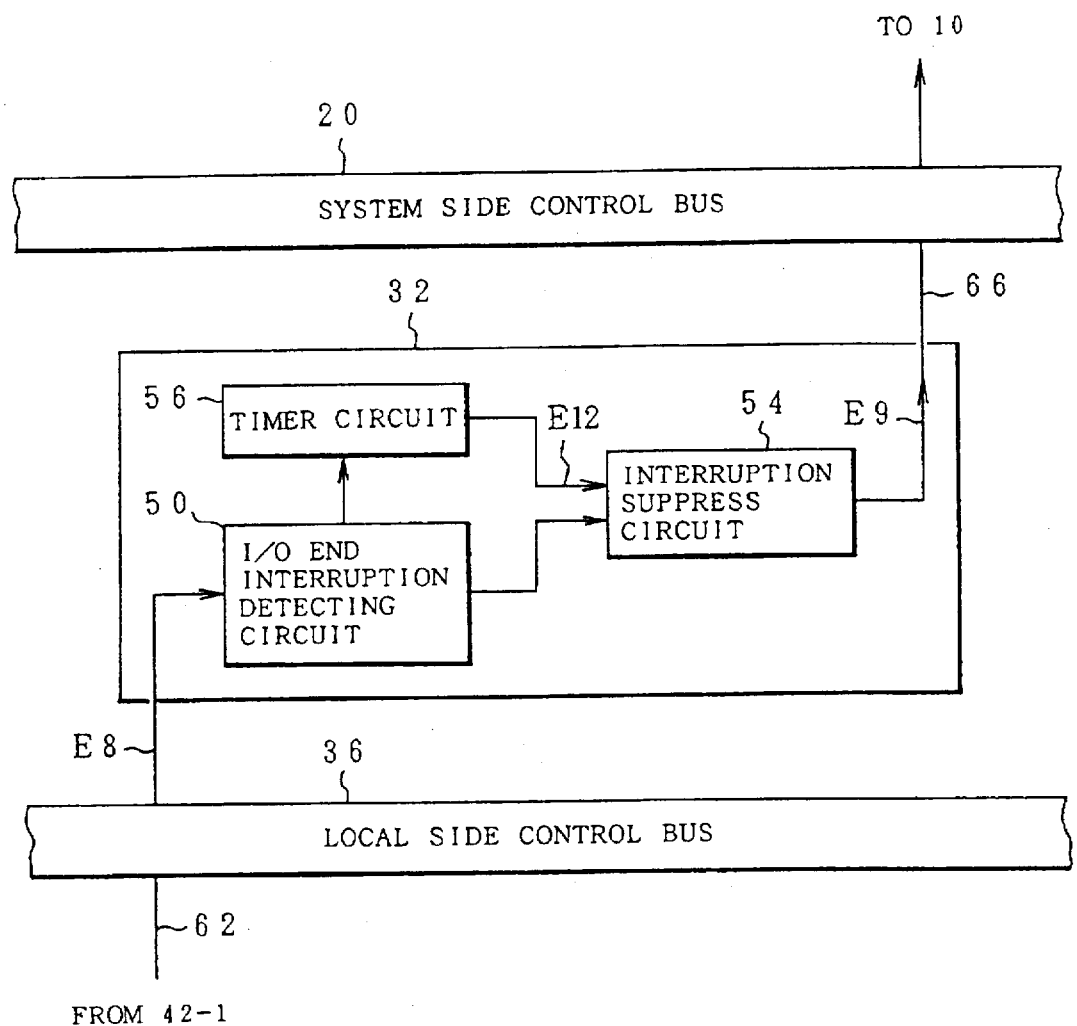
FIG. 5 is a block diagram of a second embodiment of the interruption control section shown in FIG. 1.

FIG. 5 is a second embodiment of the data transfer monitor section 46 and the response suppress section 48 provided in the interruption control section 32 in the bus controller 26 shown in FIG. 1. This second embodiment is characterized in that a timer circuit 56 is provided in place of the bus grant signal monitoring circuit 52 provided in the first embodiment shown in FIG. 2. The timer circuit 56 is started by detection output of the input/output end interruption detecting circuit 50, counts the maximum time T1 required from the detection of the input/output interrupt end notice up to the completion of transfer of all data remaining in the buffer memory to the main storage unit 12, and enables the timer signal E12. The interruption suppressing circuit 54 suppresses sending of the interruption signal E9 to the processor 10 during the timer signal E12 from the timer circuit 56 is disabled, and when the timer signal E12 is disabled, releases suppression to send the interruption signal E9 to the processor 10.

Figure 6:
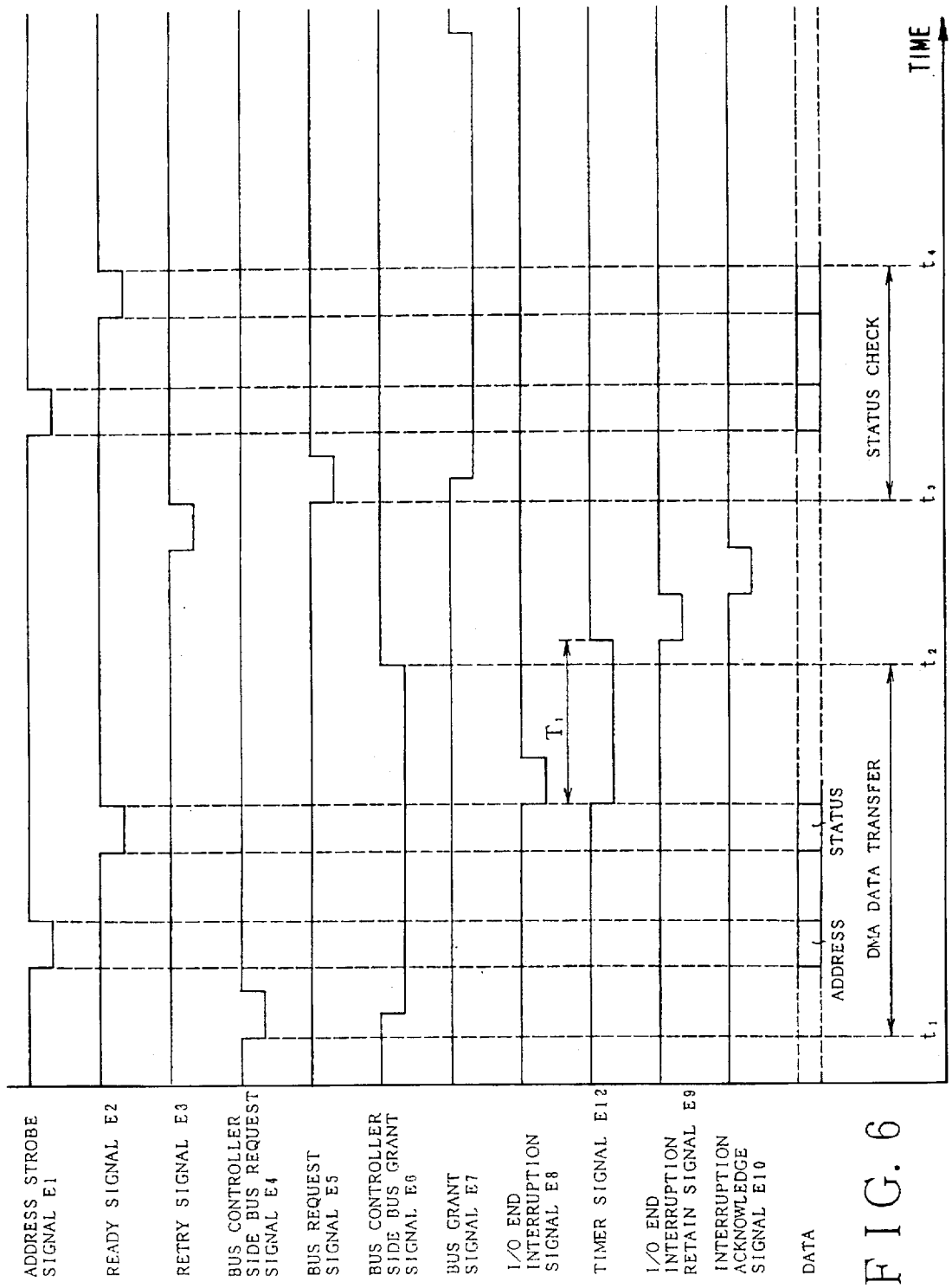
FIG. 6 is a timing chart of the signal waveform of bus control shown in FIG. 5.

The timing chart of FIG. 6 is data transfer processing in the interruption control section 32 shown in FIG. 5. In this timing chart, a timer signal E12 is added to the timing chart of FIG. 3. In DMA data transfer during the period of time between times of day t1 and t2, the timer signal E12 is enabled in synchronization with sending of the input/output end interruption signal E8 upon completion of transfer of status information, and disabled after the lapse of a set time T1 necessary for prescribed data transfer from this point. During the time T1 during which the timer E12 is enabled, the bus grunt signal E6 on the bus controller 26 side in the system bus 18 resumes the disabled state at the time of day t2, and at this time of day t2, data transfer from the buffer memory 30 to the main storage unit 12 is completed. Accordingly, after the time of day t2, the timer signal E12 releases suppression by resuming the enabled state, and it is thus possible to provide an output of the input/output end interrupt notice signal E9 to the processor 10.

Figure 7:
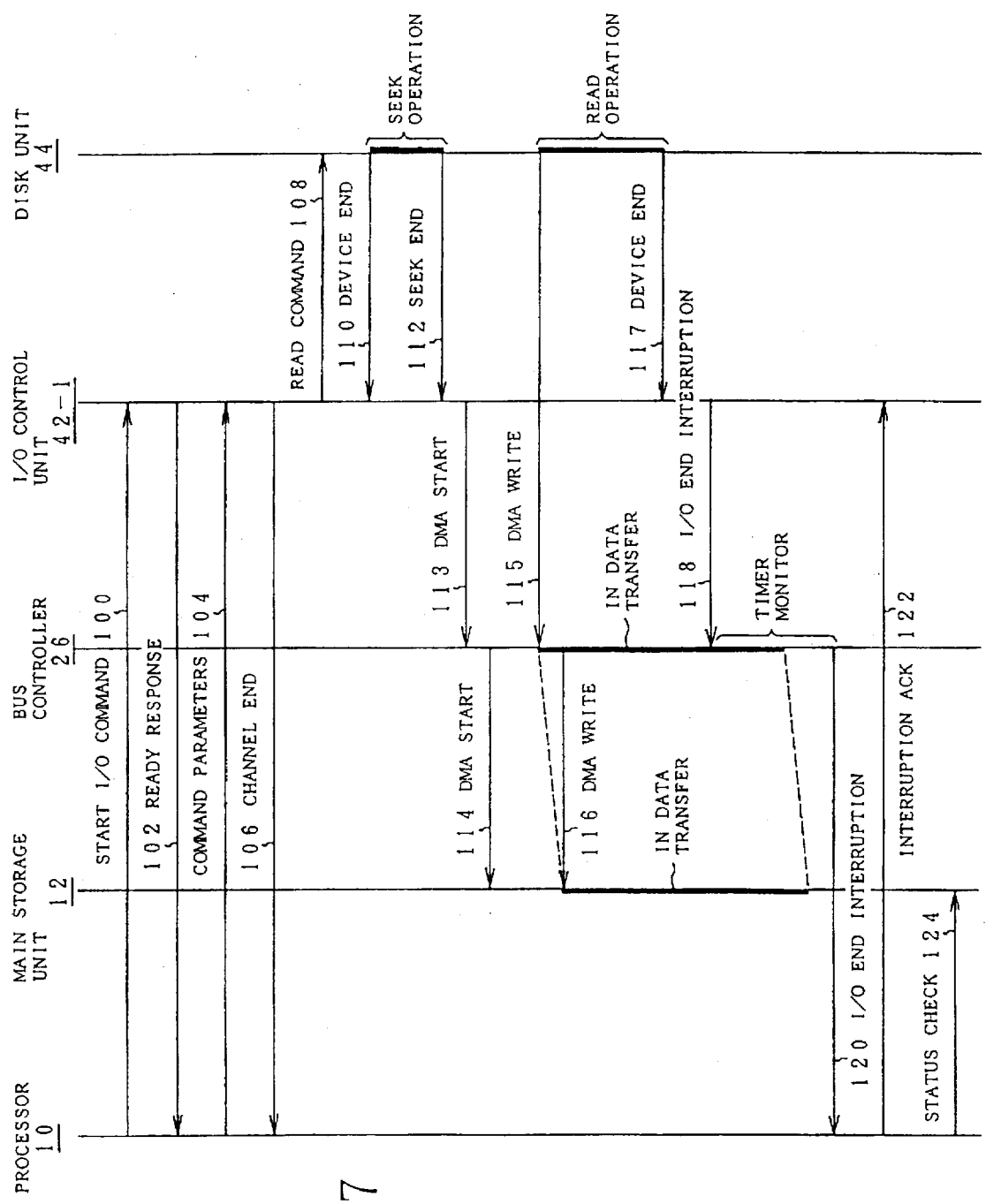
FIG. 7 is a time chart of processing operations shown in FIG. 5.

The time chart of FIG. 7 is data transfer in the interruption control section 32 of FIG. 5. In this time chart, upon receipt of the input/output end interrupt 118 from the input/output control unit 42-1, timer monitoring is started by the bus controller 26, and after the lapse of a set time T1, the input/output end interrupt notice 120 is issued to the processor 10. In the meantime, data transfer from the buffer memory of the bus controller 26 to the main storage unit 12 has been completed, and consistency of data can thus be maintained.

Figure 8:
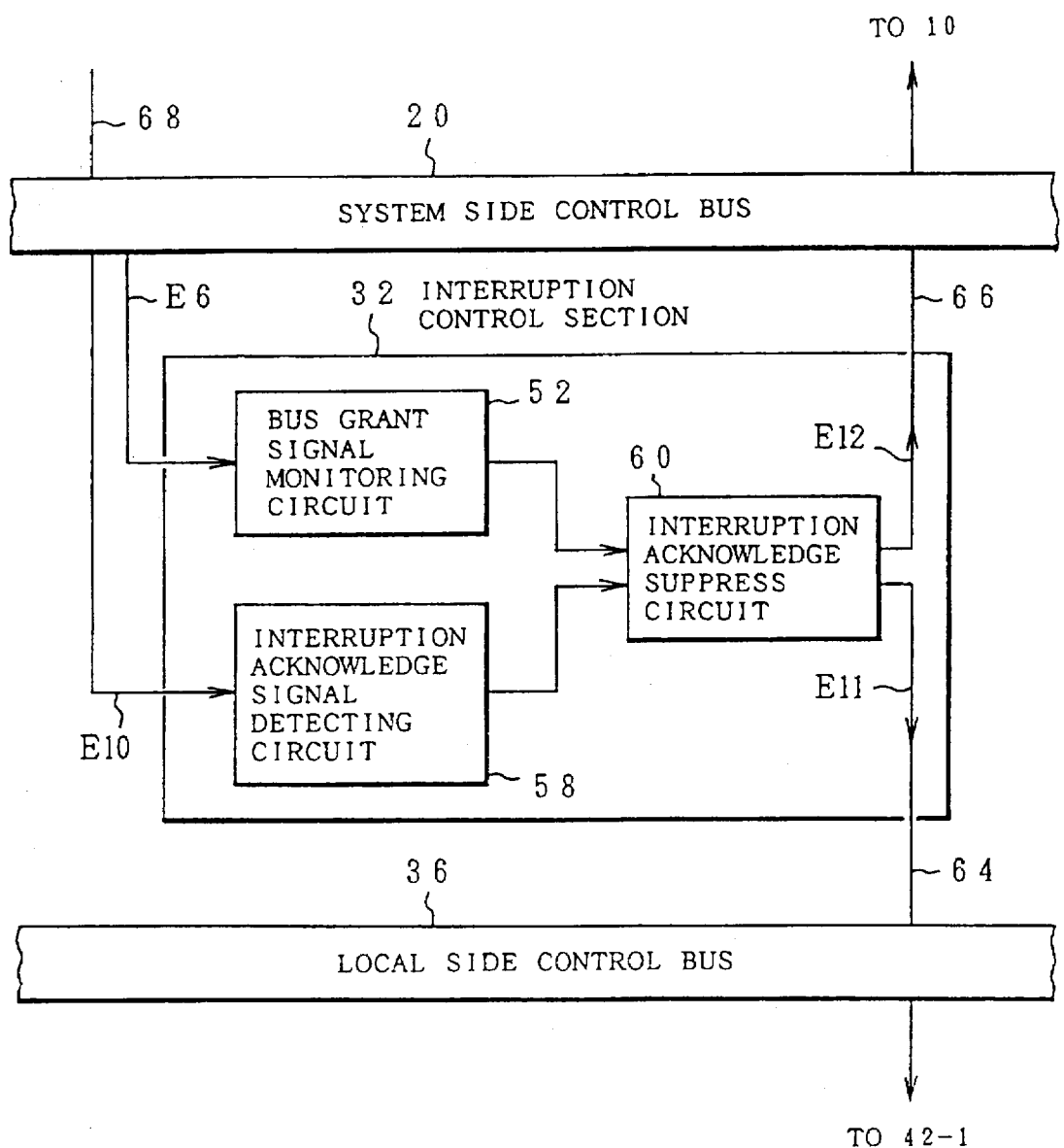
FIG. 8 is a block diagram of a third embodiment of the interruption control section shown in FIG. 1.

FIG. 8 shows a third embodiment of the interruption control section 32 provided in the bus controller 26. The third embodiment is characterized in that the interruption acknowledge signal sent out by the processor 10 upon receipt of the input/output end interrupt notice from the input/output control unit 42-1 is suppressed.

In FIG. 8, the interruption control section 32 is provided with a bus grant signal monitoring circuit 52, an interruption acknowledge signal detecting circuit 58, and an interruption acknowledge suppressing circuit 60. The interruption acknowledge signal detecting circuit 58 detects the interruption acknowledge signal E10 sent through the interruption acknowledge response signal line 68 from the processor 10 to respond to the input/output request interruption end notice from the interruption control section 32, and provides an output to the interruption acknowledge suppressing circuit 60. The bus grunt signal monitoring circuit 52 enters the bus grunt signal E6 in the controller bus 20 of the system bus 18, produces a suppressing output to the interruption acknowledge suppressing circuit 60 in the enabled state during data transfer, and in the disabled state upon completion of data transfer, provides a suppress releasing output. Accordingly, the interruption suppressing circuit 60 suppresses the interruption acknowledge notice to the input/output control unit 42-1 sent through the interruption acknowledge response line 64 if, upon receipt of a detection output of the interruption acknowledge signal E1 from the interruption acknowledge signal detecting circuit 58, the bus grant signal E8 from the bus grunt signal monitoring circuit 52 is in the enabled state. When, in this state, a suppress release output is obtained in the disabled state of the bus grant signal E6 achieved by the end of data transfer from the bus grant signal monitoring circuit 52, the interruption acknowledge notice signal E11 is issued to the interruption acknowledge response line 64. At the same time, the interruption acknowledge suppressing circuit 60 issues the interruption notice signal E12 showing output of the interruption acknowledge notice signal to the input/output control unit 42-1, by the use of the interruption control line 66 to the processor 10. Upon receipt of the interruption notice signal showing the notice of this interruption acknowledge signal E11, the processor 10 starts again the status check routine for the main storage unit 12 after completion of data transfer so far suppressed.

Figure 9:
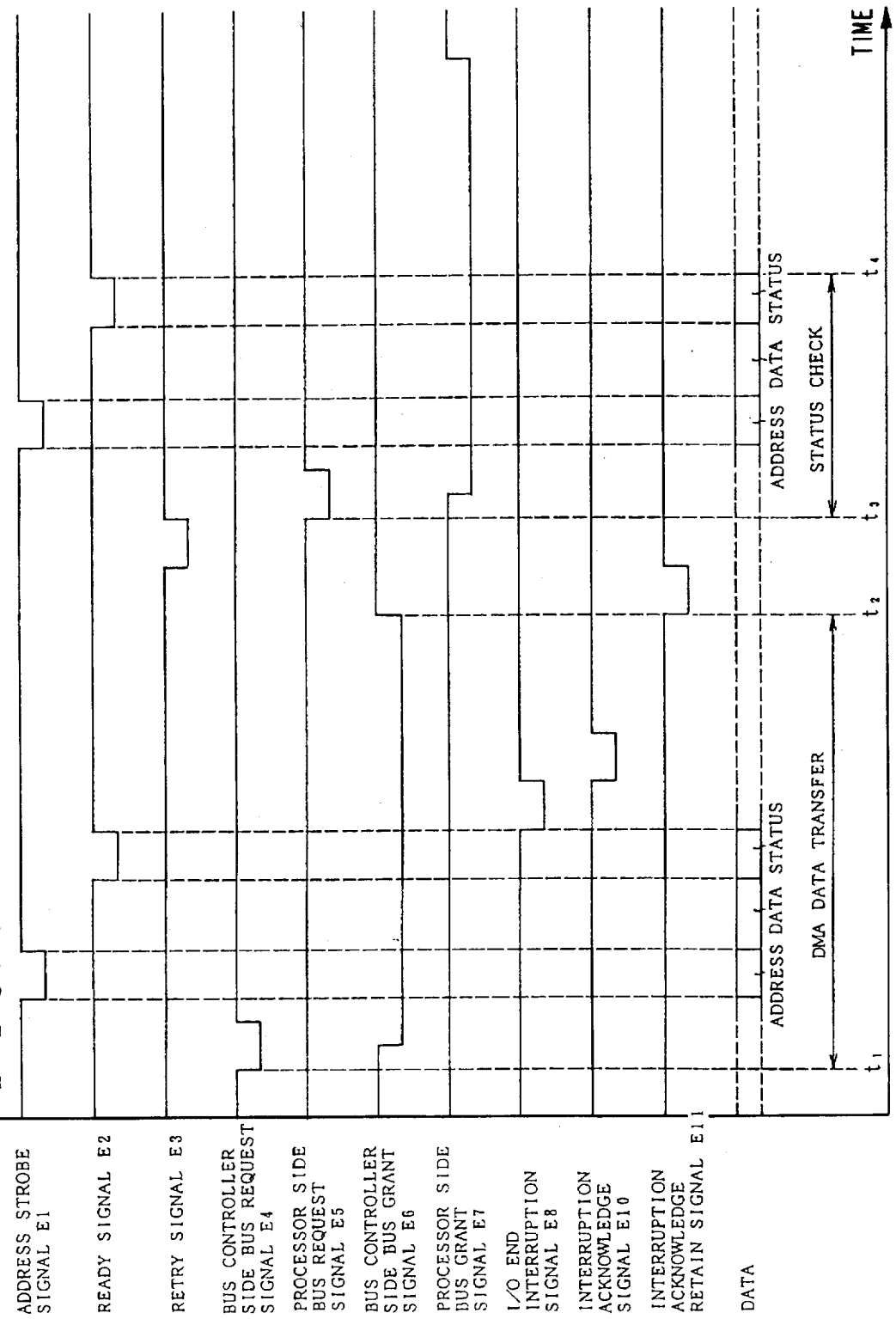
FIG. 9 is a timing chart of the signal waveform of bus control shown in FIG. 8.

The timing chart of FIG. 9 shows signal waveforms during data transfer to the system bus 18 in the third embodiment of FIG. 8. In FIG. 9, as compared with FIG. 3, the input/output end interrupt notice signal E9 is eliminated, and in place thereof, an interruption acknowledge notice signal E11 is newly added.

In FIG. 9, the times of day t1 to t2 indicate DMA data transfer through the buffer memory 30 of the bus controller 26 to the main storage unit 12. The times of day t3 to t4 show status check of the main storage unit 12 by the processor 10 after completion of data transfer. When the input/output end interruption signal E8 is obtained as a result of completion of data transfer in DMA data transfer starting from the time of day t1, an interruption is directly notified to the processor 10, and an interruption acknowledge signal E10 is sent from the processor 10. Since the bus grant signal E6 on the bus controller 26 side at this point is in the enabled state which represents data in transfer, notice of interruption acknowledge to the input/output control unit 42-1 is suppressed. At the same time, status check processing of the next main storage unit 12 in the processor 10 is also suppressed.

In the suppressed state of the interruption acknowledge notice, when data transfer is completed, and the bus grant signal E6 on the bus controller side becomes in the disabled state at the time of day t2, suppression of interruption acknowledge is released, an interruption acknowledge notice signal E11 being sent to the input/output control unit 42-1. Simultaneously, an interruption notice (not shown) meaning output of the interruption acknowledge notice signal E11 is given to the processor 10, so that processing for status check during the period between the times of day t2 and t4 can be resumed.

Even in the third embodiment, as described above, notice of the interruption acknowledge and status check processing for the next main storage unit 12 in the processor 10 are kept until acknowledgement of the end of data transfer with the bus grant signal E6 becoming in disabled state. Consequently, loss of consistency of data can be certainly prevented by the receipt of the input/output end interruption notice and acquisition of the system bus 18 during data transfer by the processor 10.

Figure 10:
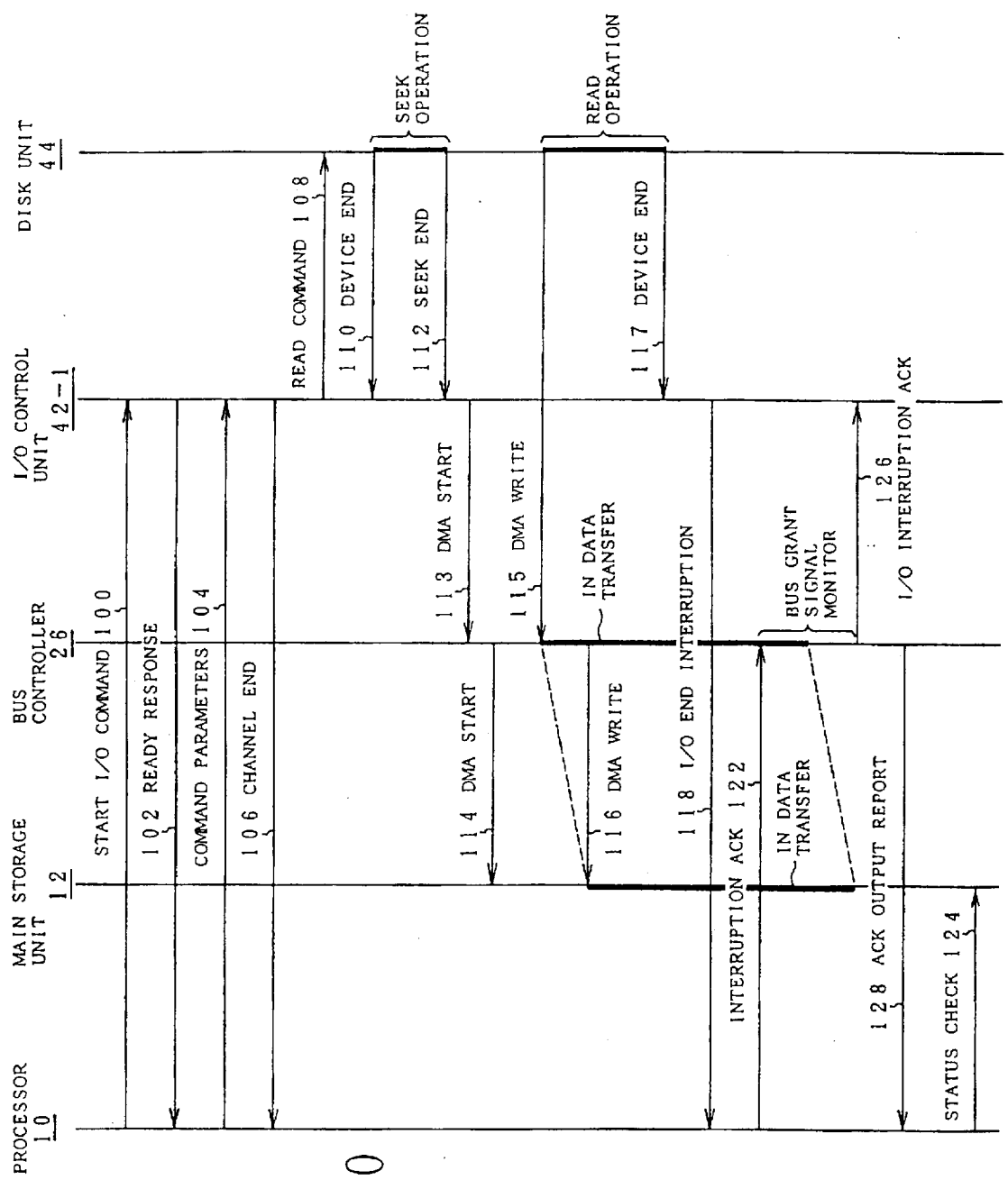
FIG. 10 is a time chart of processing operations shown in FIG. 8.

The time chart of FIG. 10 represents gives-and-takes between the individual units in the third embodiment shown in FIG. 8. When the input/output end interruption 118 from the input/output control unit 42-1 is notified through the bus controller 26 to the processor 10, the processor 10 sends the interruption acknowledge 112 to the bus controller 26. If, in this state, data is being transferred from the buffer memory 30 of the bus controller 26 to the main storage unit 12, the bus grant signal is in enabled state. Accordingly, the bus controller 26 suppresses sending of interruption acknowledge of the end of input/output to the input/output control unit 42-1. On the processor 10 side, at the same time, transition to status check for the next main storage unit 12 resulting from interruption notice of the end of input/output is suppressed. If data transfer comes to an end and the bus grant signal becomes in disabled state during suppression, the bus controller 26 releases suppression, and an interruption acknowledge 126 of the input/output end is issued to the input/output control unit 42-1 to lead to a normal end. At the same time, an acknowledge output report 128 is given to the processor 10 to resume processing for the next status check 124 so far suppressed.

Figure 11:
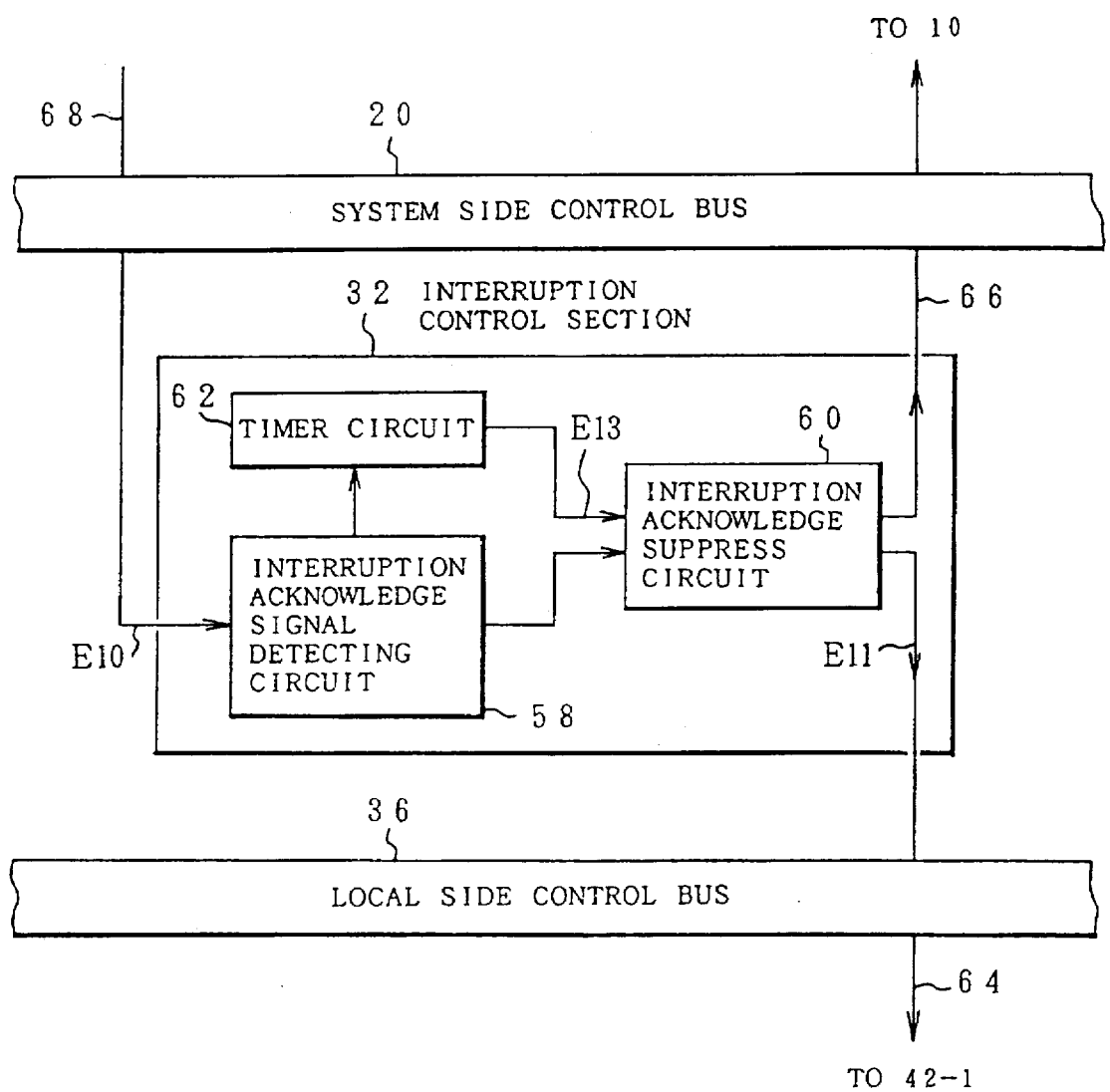
FIG. 11 is a block diagram of a fourth embodiment of the interruption control section shown in FIG. 1.

FIG. 11 is a fourth embodiment of the data transfer monitor section 46 and the response suppress section 48 provided in the interruption control section 32 of the bus controller 26 shown in FIG. 1. The fourth embodiment is characterized in that a timer circuit 62 is provided in place of the bus grant signal monitoring circuit 52 of the third embodiment shown in FIG. 8. The configuration of the interruption acknowledge signal detecting circuit 58 and the interruption acknowledge suppressing circuit 60 other than the timer circuit 62 is the same as that in FIG. 8.

The timer circuit 62 is started through detection of the interruption acknowledge signal E10 from the processor 10 by the interruption acknowledge signal detecting circuit 58, and after the lapse of the set time T2, provides output of the suppression release signal E13 to the interruption acknowledge suppression circuit 60. The set time T1 of the timer circuit 62 is determined on the basis of the maximum time required from the receipt of the interruption acknowledge of the processor 10 to the completion of transfer of all data remaining in the buffer memory 30 of the bus controller 26 to the main storage unit 12.

Figure 12:
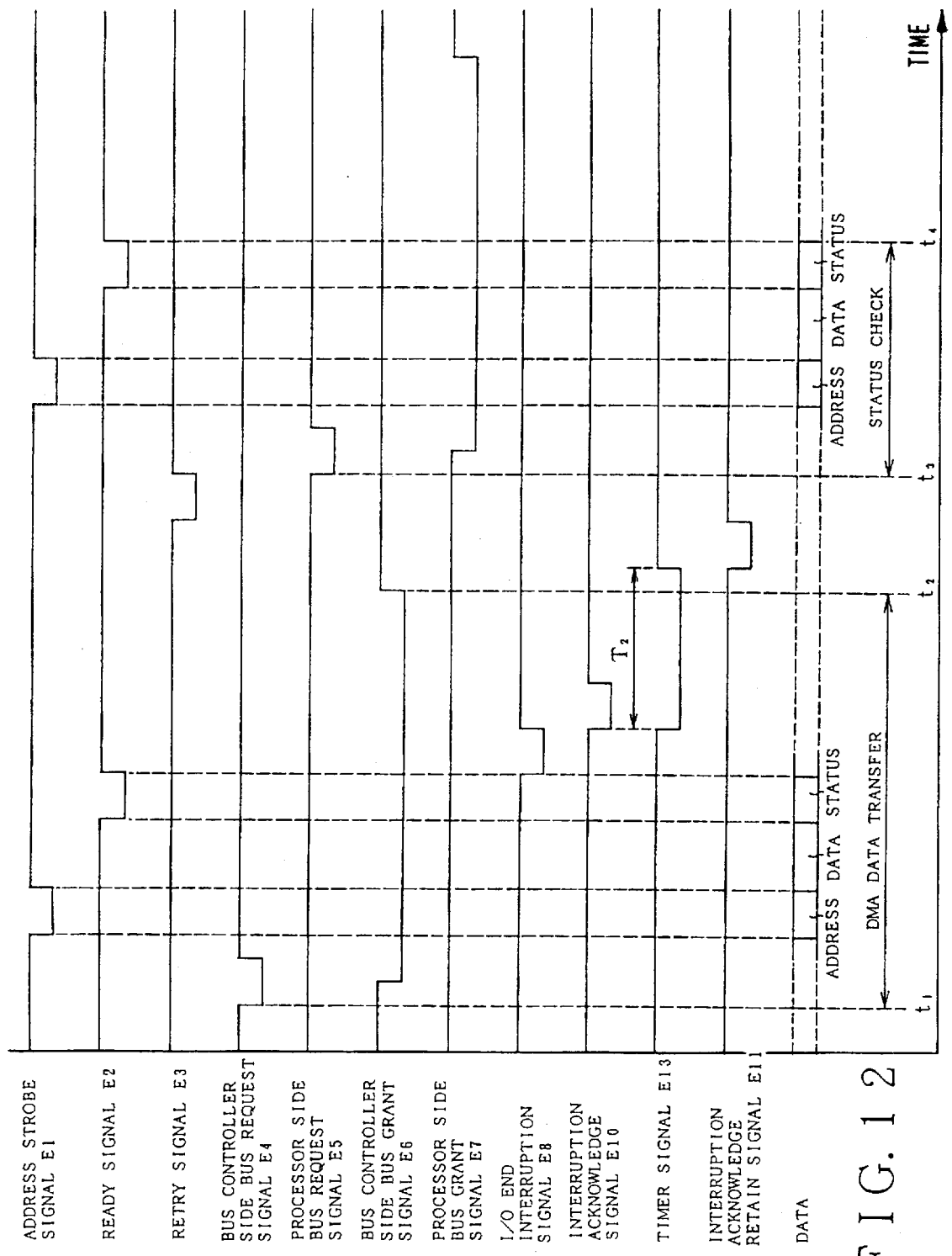
FIG. 12 is a timing chart of the signal waveform of bus control shown in FIG. 11.

The timing chart of FIG. 12 shows signal waveforms of the individual parts on the system bus 18 side in the fourth embodiment shown in FIG. 11. This timing chart shows a timer signal E13 in place of the interruption acknowledge notice signal E11 shown in FIG. 9. The timer signal E13 is in enabled state for the set time T2 in synchronization with sending of the interruption acknowledge signal E10. When acquiring the interruption acknowledge signal E10, the bus grunt signal E6 on the bus controller 26 side is in the enabled state which represents that data is in transfer, and notice of interruption acknowledge and transition to the next status check in the processor 10 are suppressed. Upon completion of data transfer at the time of day t2, the bus grant signal E6 on the bus controller 26 side becomes in disabled state. Then, the timer signal E13 is brought into disabled state as a result of timeout, leading to release of suppression, and the interruption acknowledge notice signal E11 is sent out. Simultaneously, suppression of interruption notice to the processor side is released, and this leads to status check processing for the main storage unit 12 during the period between the times of day t3 and t4.

The time chart of FIG. 13 shows gives-and-takes between the individual units shown in FIG. 11. The input/output end interruption from the input/output control unit 42-1 is notified through the bus controller 26 directly to the processor 10, and the processor 10 issues an interruption acknowledge 112 to the bus controller 26. Upon receipt of this interruption acknowledge 112, the bus controller 26 starts the timer, and upon the lapse of the set time T2, deems data transfer to come to an end, notifying an input/output interruption acknowledge 130 to the input/output control unit 42-1. At the same time, the bus controller 26 gives an acknowledge output report 132 to the processor 10. Since the set time T2 for timer monitor is determined taking account of a sufficient time necessary from the issuance of the interruption acknowledge 122 until completion of data transfer from the buffer memory 30 to the main storage unit 12, data transfer is completed without fail at the point of timeout. Even when the bus controller 26 gives the acknowledge output report 132 to the processor 10 to cause execution of the next status check, therefore, acquisition of the system bus 18 by the processor 10 does not lead to destruction of data, thus ensuring consistency of data, because data transfer from the buffer memory 30 of the bus controller 26 to the main storage unit 12 has already been completed.

Even when data transfer on the local bus side connected with the input/output unit has been completed earlier, and data transfer from the buffer memory of the bus controller to the main storage unit of the system bus is in delay, as described above, the new system bus is acquired by the processing unit after acknowledging the end of data transfer carried out in a hardware-manner in the system bus. It is therefore possible to certainly prevent data consistency from being impaired through discontinuance of data transfer to the main storage unit, and to achieve high-reliability and high-speed data transfer.

It is similarly possible to perform high-speed data transfer with an ensured data consistency in the input/output unit and the main storage unit, by suppressing interruption acknowledge response regarding input/output end interruption to the processor, and simultaneously suppressing processing for the next main storage unit by the processing unit until acknowledgement of the end of actual data transfer in the system bus.

In the above-mentioned embodiments, interruption notice and interruption acknowledge notice are given and taken for DMA transfer control by providing special interruption lines between the bus controller 26 and the processor 10, and between the input/output control unit 42-1 and the bus controller 26. However when control lines for control buses of the system bus 18 and the local bus 34 have a room, gives-and-takes of interruption notice and interruption acknowledge response for DMA control may be conducted with the use of these control lines.

The present invention is applicable without any modification to any appropriate system configuration so far as it has common equipment on the system bus side and input/output units on the local bus side.

What is claimed is:

1. A data transfer control apparatus, comprising:

a system bus;

a processor connected to said system bus;

a main storage unit connected to said system bus;

a local bus having a data transfer speed that is equal to or greater than that of said system bus;

an input/output control unit connected to said local bus;

an input/output unit connected to and under control of said input/output control unit;

a data transfer control section, connected between said system bus and said local bus, for transferring data, upon receipt of an input/output request from said processor, without depending upon said processor, with said input/output unit through said main storage unit connected to said system bus and said input/output unit connected to said local bus;

a buffer memory for temporarily storing data to be transferred by said data transfer control section;

an interruption control section which, upon detection of an input/output end interrupt signal sent out from said input/output control unit upon completion of data transfer of said input/output unit, notifies completion of data transfer to said processor, and communicates an interruption acknowledge signal issued by said processor upon receipt of the input/output end interrupt signal to said input/output control unit;

a data transfer monitor section which determines the completion of data transfer from said buffer memory to said main storage unit; and a response suppress section which, upon detection of the input/output end interrupt signal in said interruption control section, suppresses output of the input/output end interrupt signal to said processor, and upon acquisition of an indication of completion of data transfer in said data transfer monitor section, and provides an output of said input/output end interrupt signal to said processor.

2. An apparatus according to claim 1, wherein said data transfer monitor section determines the completion of data transfer from a signal status of said system bus.

3. An apparatus according to claim 1, wherein said data transfer monitor section is a timer section which determines the completion of data transfer when a predetermined time elapses from the detection of said input/output end interruption signal.

4. An apparatus according to claim 1, wherein:

said data transfer control section, said buffer memory, said interruption control section, said data transfer monitor section and said response suppress section are provided in said bus controller which performs data transfer between said system bus and said local bus.

5. A data transfer control apparatus comprising:

a system bus;

a processor connected to said system bus;

a main storage unit connected to said system bus;

a local bus having a data transfer speed that is equal to or greater than that of said system bus;

an input/output control unit connected to said local bus;

an input/output unit connected to and under control of said input/output control unit;

a data transfer control section which is connected between said system bus and said local bus, and without depending upon said processor after receipt of an input/output request from said processor, transfers data from said input/output unit to said main storage unit connected to said system bus via said input/output control unit connected to said local bus;

a buffer memory which temporarily stores data transferred by said data transfer control section;

an interruption control section which, upon detection of an input/output end interrupt signal sent from said input/output control unit as a result of the end of data transfer of said input/output unit, notifies completion of data transfer to said processor, and communicates an interruption acknowledge signal issued by said processor upon receipt of said input/output end interrupt signal to said input/output control unit;

a data transfer monitor section which determines the end of data transfer from said buffer memory to said main storage unit; and a response suppress section which, upon detection of an interruption acknowledge signal from said processor in said interruption control section, suppresses output of said interruption acknowledge signal to said input/output control unit, and when a result of determination showing the end of data transfer is obtained at said data transfer monitor section, provides an output of said interruption acknowledge signal in suppressed state to said input/output control unit, and at the same time issues an interruption notice signal to said processor.

6. An apparatus according to claim 5, wherein said data transfer monitor section determines the completion of data transfer from a signal status of said system bus.

7. An apparatus according to claim 6, wherein said data transfer monitor section is a timer section which determines the completion of data transfer when a predetermined set time elapses from the detection of said input/output end interruption acknowledge signal.

8. An apparatus according to claim 5, wherein:

said data transfer control section, said buffer memory, said interruption control section, said data transfer monitor section and said response suppress section are provided in said bus controller which performs data transfer between said system bus and said local bus.

9. A DMA data transfer control apparatus for use in a computer system having a plurality of processors coupled to a system bus, a memory section coupled to the same system bus, and a plurality of I/O control units coupled to a local bus, the local bus having a data transfer speed that is equal to or greater than that of said system bus, which regulates the transfer of data between the local bus coupled devices and system bus coupled devices, comprising:

a response suppress section which, upon detection of an input/output end interrupt signal from one of said I/O control units coupled to said local bus, suppresses output of the input/output end interrupt signal to one of said processor and, upon completion of data transfer, provides an output of the input/output end interrupt signal indicating a disabled state to said processor.

10. A data transfer control method for use in a computer system having a plurality of processors and a main memory coupled to a system bus, a plurality of I/O control units coupled to a local bus, and a buffer memory connected between the system bus and the local bus, said method regulating the transfer of data between the I/O control units coupled to the local bus and the processors and the main memory coupled to the system bus through the buffer memory, comprising:

(a) initiating data transfer from the I/O control unit to the main memory via the buffer memory;

(b) detecting an interrupt signal generated by the local bus indicating that the I/O control unit has completed the data transfer and suppressing the interrupt signal to prevent communication of the interrupt signal to the processors;

(c) determining completion of the data transfer from the buffer memory to the main memory and producing a data transfer signal to at least one of the processors; and (d) checking status by the at least one of the processors, upon receiving the data completion signal, to assure that the data transfer was accurately completed.

* * * * *